April 14, 1959
W. BATT
2,881,816
IMPLEMENT WITH A HANDLE FOR SECURELY HOLDING
TUBERS AND THE LIKE WHEN PEELING
AND PREPARING THE SAME
Filed April 24, 1957
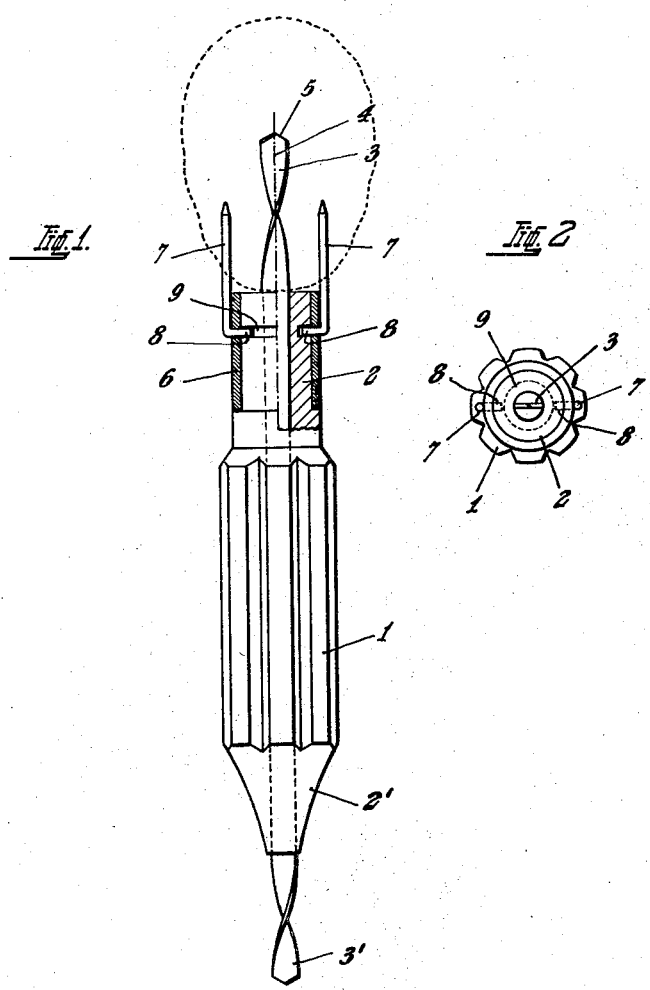
Inventor
Werner Batt
By Michael S. Striker
agt.

2,881,816
IMPLEMENT WITH A HANDLE FOR SECURELY HOLDING TUBERS AND THE LIKE WHEN PEELING AND PREPARING THE SAME

Werner Batt, Ostermundigen, near Bern, Switzerland

Application April 24, 1957, Serial No. 654,875

8 Claims. (Cl. 146—216)

Claims priority, application Switzerland August 3, 1956

The object of the present invention is an implement with a handle for securely holding tubers and the like, such as potatoes, carrots, celery, etc., when peeling and preparing same with a knife. The purpose of this implement is to avoid having to hold the tuber and the like between the fingers while peeling and preparing it since in doing so the fingers are liable to being injured by the kitchen knife.

According to the invention a longitudinally twisted mandrel and spaced laterally therefrom at least one prong are provided on the handle, said two parts projecting in the same direction beyond the handle and one of them being rotatable relative to the other about the axis of the mandrel.

By way of example an embodiment of the implement according to the invention will now be described with reference to the accompanying drawing in which:

Fig. 1 is a side view of the implement partly in longitudinal section, and

Fig. 2 is a top view of one of the ends of the handle.

The implement has a stem-like handle 1 in each one of the two ends 2 and 2' of which a mandrel 3 and 3', respectively, is inserted coaxially to the handle and projects beyond said handle. The projecting portion of each mandrel is formed from a flat bar twisted by barely half a turn about the axis 4 of the mandrel and is given a point at its free end. The end edges 5 of the mandrel converging at the point are sharpened to form cutting edges.

On the end 2 of the handle there is arranged a cylindrical sleeve 6 coaxially to the axis of the mandrel and is rotatable about the latter. At the outer periphery of the sleeve two prongs 7 are secured at two diametrically opposite points which prongs project beyond the end 2 of the handle in the same direction as the mandrel 3, but only for about half the projecting length of the latter. The sleeve-sided end 8 of each prong 7 is bent at right angles and projects through the sleeve wall into an annular groove 9 provided in the handle end 2 to prevent an axial displacement of the sleeve 6.

The tuber 10 to be prepared is pushed onto the mandrel 3 and then also onto the prongs 7, the sleeve 6 following the rotation of the tuber imparted to it by the twist of the mandrel. When peeling the tuber, the sleeve 6 is prevented from rotating by the hand holding the handle and thus the tuber cannot be stripped off from the implement.

With very slim tubers, such as black salsify, the prongs 7 are unable to penetrate into them when being pushed on to the mandrel and would be a hindrance to peeling. For this case the handle is tapered to a slim handle end 2' at the opposite side and is provided with a mandrel 3' the bar width of which is slightly less than that of the mandrel 3. With carrots, black salsify, etc. the nature of the substance is such that it adheres sufficiently to the mandrel by itself without any further fixation against rotation and can be prepared without slipping off the mandrel 3'.

On the sleeve 6 a single prong only might be provided. To facilitate holding the sleeve securely the sleeve can be made polygonal at its outer periphery.

What I claim is:

1. An implement for holding tubers and the like, comprising, in combination, a handle; a screw-type elongated holding member mounted on said handle and having a front end projecting from said handle; elongated prong means projecting from said handle parallel to said screw-type elongated holding member a shorter distance than the front end of said screw-type elongated holding member; and attaching means mounting said prong means in such position on said handle for turning movement about the axis of said elongated holding member, so that during use of said implement the front end of said screw-type holding member will engage the tuber to be held before the same is engaged by the front end of said prong means, whereby continued screwing-in of said screw-type holding member into the tuber will automatically result in insertion of said prong means into said tuber.

2. An implement for holding tubers and the like, comprising, in combination, a handle; a screw-type elongated holding member mounted on said handle and having a front end projecting from said handle, said holding member being formed from a flat bar twisted uniformly about the longitudinal axis thereof; elongated prong means projecting from said handle parallel to said screw-type elongated holding member a shorter distance than the front end of said screw-type elongated holding member; and attaching means mounting said prong means in such position on said handle for turning movement about the axis of said elongated holding member, so that during use of said implement the front end of said screw-type holding member will engage the tuber to be held before the same is engaged by the front end of said prong means, whereby continued screwing-in of said screw-type holding member into the tuber will automatically result in insertion of said prong means into said tuber.

3. An implement for holding tubers and the like, comprising, in combination, a handle; a screw-type elongated holding member mounted on said handle and having a front end projecting from said handle, said holding member being formed from a flat bar twisted uniformly less than one turn about the longitudinal axis thereof; elongated prong means projecting from said handle parallel to said screw type elongated holding member a shorter distance than the front end of said screw-type elongated holding member; and attaching means mounting said prong means in such position on said handle for turning movement about the axis of said elongated holding member, so that during use of said implement the front end of said screw-type holding member will engage the tuber to be held before the same is engaged by the front end of said prong means, whereby continued screwing-in of said screw-type holding member into the tuber will automatically result in insertion of said prong means into said tuber.

4. An implement for holding tubers and the like, comprising, in combination, a handle; a screw-type elongated holding member mounted on said handle and having a front end projecting from said handle; and elongated prong means mounted on said handle, said prong means being located substantially parallel to and adjacent said screw-type elongated holding member and turnable about the axis of the latter, said prong means projecting away from said handle a shorter distance than the front end of said screw-type elongated holding member, so that during use of said implement the front end of said screw-type holding member will engage the tuber to be held before the same is engaged by the front end of said prong means, whereby continued screwing-in of said screw-type holding member into the tuber will automatically result in insertion of said prong means into said tuber.

5. An implement for holding tubers and the like, comprising, in combination, a handle; a screw-type elongated holding member mounted on said handle and having a front end projecting from said handle; sleeve means mounted on said handle rotatably about the axis of said elongated holding member; elongated prong means projecting away from said handle parallel to said screw-type elongated holding member a shorter distance than the front end of said screw-type elongated holding member and attaching means mounting said prong means in such position on said sleeve means for turning movement about the axis of said elongated holding member, so that during use of said implement the front end of said screw-type holding member will engage the tuber to be held before the same is engaged by the front end of said prong means, whereby continued screwing-in of said screw-type holding member into the tuber will automatically result in insertion of said prong means into said tuber.

6. An implement for holding tubers and the like, comprising, in combination, a handle; a screw-type elongated holding member mounted on said handle and having a sharpened front end projecting from said handle; elongated prong means projecting away from said handle parallel to said screw-type elongated holding member a shorter distance than the front end of said screw-type elongated holding member; and attaching means mounting said prong means in such position on said handle for turning movement about the axis of said elongated holding member, so that during use of said implement the front end of said screw-type holding member will engage the tuber to be held before the same is engaged by the front end of said prong means, whereby continued screwing-in of said screw-type holding member into the tuber will automatically result in insertion of said prong means into said tuber.

7. An implement for holding tubers and the like, comprising, in combination, a handle; a screw-type elongated holding member mounted on said handle and having a front end projecting from said handle; sleeve means mounted on said handle rotatably about the axis of said elongated holding member; a projection extending radially inward from said sleeve means, said handle being formed with a groove for guiding engagement with said projection; and elongated prong means mounted on said sleeve means, said prong means projecting from said handle parallel to said screw-type elongated holding member a shorter distance than the front end of said screw-type elongated holding member, so that during use of said implement the front end of said screw-type holding member will engage the tuber to be held before the same is engaged by the front end of said prong means, whereby continued screwing-in of said screw-type holding member into the tuber will automatically result in insertion of said prong means into said tuber.

8. An implement for holding tubers and the like, comprising, in combination, a handle; a screw-type elongated holding member mounted on said handle and having a front end projecting from said handle; sleeve means mounted on said handle rotatably about the axis of said elongated holding member; and elongated prong means mounted on said sleeve means, one end of said prong means projecting radially inward from said sleeve means, said handle being formed with a groove for guiding engagement with said radially projecting end, the other end of said prong means projecting from said handle parallel to said screw-type elongated holding member a shorter distance than the front end of said screw-type elongated holding member, so that during use of said implement the front end of said screw-type holding member will engage the tuber to be held before the same is engaged by the front end of said prong means, whereby continued screwing-in of said screw-type holding member into the tuber will automatically result in insertion of said prong means into said tuber.

References Cited in the file of this patent
UNITED STATES PATENTS

| 166,171 | White | July 27, 1875 |
| 732,675 | Cochran | June 30, 1903 |
| 775,370 | Lacey | Nov. 22, 1904 |